US012624703B2

(12) United States Patent
Tang et al.

(10) Patent No.: US 12,624,703 B2
(45) Date of Patent: May 12, 2026

(54) BLOWER

(71) Applicant: Greenworks (Jiangsu) Co., Ltd, Jiangsu (CN)

(72) Inventors: Yabin Tang, Jiangsu (CN); Yunjie Shangguan, Jiangsu (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 111 days.

(21) Appl. No.: 18/597,961

(22) Filed: Mar. 7, 2024

(65) Prior Publication Data

US 2024/0209867 A1      Jun. 27, 2024

Related U.S. Application Data

(63) Continuation of application No. PCT/CN2022/115775, filed on Aug. 30, 2022.

(30) Foreign Application Priority Data

Sep. 14, 2021      (CN) .......................... 202122228456.1
Sep. 14, 2021      (CN) .......................... 202122229544.3

(51) Int. Cl.
  *F04D 25/16*      (2006.01)
  *A01G 20/47*      (2018.01)
      (Continued)

(52) U.S. Cl.
  CPC ........... *F04D 25/166* (2013.01); *A01G 20/47* (2018.02); *E01H 1/0809* (2013.01);
      (Continued)

(58) Field of Classification Search
  CPC .... F04D 29/545; F04D 29/547; F04D 25/166; A01G 20/47; E01H 1/0809
      (Continued)

(56) References Cited

U.S. PATENT DOCUMENTS 5,788,568  A  *  8/1998  Ito ......................... F04D 25/166
                                                            454/192
7,963,749  B1 *  6/2011  Mecozzi ............... F04D 27/004
                                                            417/309

(Continued)

FOREIGN PATENT DOCUMENTS

CN      206815252  U      12/2017
CN      207693144  U      8/2018
CN      108797480  A      11/2018

OTHER PUBLICATIONS

International search report of PCT Patent Application No. PCT/CN2022/115775 issued on Nov. 28, 2022.

*Primary Examiner* — Charles G Freay

(57)      ABSTRACT
A blower includes: a housing, having an air inlet end and an air outlet end; and a duct assembly disposed in the housing and located between the air inlet end and the air outlet end. The duct assembly includes an outer duct and a motor fan blade assembly disposed in the outer duct. The motor fan blade assembly includes a first motor fan blade assembly and a second motor fan blade assembly; the first motor fan blade assembly includes a first fan blade and a first motor that drives the first fan blade to rotate about a first output axis of the first motor; the second motor fan blade assembly includes a second fan blade and a second motor that drives the second fan blade to rotate about a second output axis of the second motor; and the first output axis is parallel to the second output axis.

17 Claims, 10 Drawing Sheets

(51) Int. Cl.

| | |
|---|---|
| *E01H 1/08* | (2006.01) |
| *F04D 19/00* | (2006.01) |
| *F04D 25/08* | (2006.01) |
| *F04D 29/54* | (2006.01) |

(52) U.S. Cl.
CPC ........... *F04D 19/002* (2013.01); *F04D 25/08* (2013.01); *F04D 29/545* (2013.01)

(58) Field of Classification Search
USPC ...................................................... 417/423.5
See application file for complete search history.

(56) References Cited

U.S. PATENT DOCUMENTS

| | | | |
|---|---|---|---|
| 11,109,541 B2 * | 9/2021 | Huo ........................ | A01G 20/47 |
| 2011/0275302 A1 * | 11/2011 | Tarada .................. | F04D 29/547 |
| | | | 454/166 |
| 2017/0260985 A1 * | 9/2017 | Gao ...................... | F04D 25/084 |

* cited by examiner

BLOWER

CROSS REFERENCE TO RELATED APPLICATION

The present application is a continuation application of PCT Application No. PCT/CN2022/115775, filed on Aug. 30, 2022, which claims the benefit of priority to a Chinese Patent Application number CN202122229544.3, filed on Sep. 14, 2021, and a Chinese Patent Application number CN202122228456.1, filed on Sep. 14, 2021, the disclosure of the above applications is hereby incorporated by reference in their entireties for all purposes.

TECHNICAL FIELD

The present disclosure relates to the technical field of garden tools, and in particular, to a blower.

BACKGROUND

A blower is a common garden tool, and is mainly used to blow and clear debris such as leaves, road dust, water, and snow. An existing blower generally uses a combination of a single motor and a single fan blade. To ensure wind force and an air volume, a large fan blade is generally used. Due to the large fan blade, a requirement of providing a high wind speed and a high air volume at a high rotational speed cannot be met, and the large fan blade has poor stability, a high dynamic balance requirement, and large working noise.

SUMMARY

The present disclosure provides a blower, to resolve technical problems in the conventional technology that a blower using a large fan blade cannot meet a requirement of providing a high wind speed and a high air volume at a high rotational speed, and the large fan blade has poor stability, a high dynamic balance requirement, and large working noise.

The present disclosure provides a blower, including:

a housing, having an air inlet end and an air outlet end; and a duct assembly, where the duct assembly is disposed in the housing, and the duct assembly is located between the air inlet end and the air outlet end, where the duct assembly includes an outer duct and a motor fan blade assembly, and the motor fan blade assembly is disposed in the outer duct;

the motor fan blade assembly includes a first motor fan blade assembly and a second motor fan blade assembly;

the first motor fan blade assembly includes a first motor and a first fan blade, and the first motor drives the first fan blade to rotate about a first output axis of the first motor;

the second motor fan blade assembly includes a second motor and a second fan blade, and the second motor drives the second fan blade to rotate about a second output axis of the second motor; and the first output axis is parallel to the second output axis.

In an optional embodiment, the first motor fan blade assembly is disposed in the outer duct side-by side with the second motor fan blade assembly.

In an optional embodiment, the blower further includes a blowpipe, the blowpipe is connected to the air outlet end, and the blowpipe has a first air guide channel and a second air guide channel that are independent of each other; the first motor fan blade assembly communicates with the first air guide channel for allowing air generated by the first motor fan blade assembly to flow along the first air guide channel; and the second motor fan blade assembly communicates with the second air guide channel for allowing air generated by the second motor fan blade assembly to flow along the second air guide channel.

In an optional embodiment, the blowpipe has two air guide channels disposed in parallel, and each air guide channel corresponds to one of the motor fan blade assemblies.

In an optional embodiment, the blower further includes a nozzle, the nozzle has a connection end and an air outlet opposite to the connection end, the connection end of the nozzle is connected to an end that is of the blowpipe and that is away from the outer duct, and the nozzle is configured to converge the air flown out from the first air guide channel and the second air guide channel and then flow out the air through the air outlet.

In an optional embodiment, a shape of the air outlet includes a circular hole, an oblong hole, or a shape formed by joining end points of two equal-radius major arcs.

In an optional embodiment, the air outlet is divided into two independent sub-outlets, and each sub-outlet communicates with one of the air guide channels.

In an optional embodiment, the motor fan blade assembly further includes an inner duct, and the inner duct is disposed in the outer duct.

In an optional embodiment, the motor fan blade assembly further includes a guiding cone, and the guiding cone is mounted at an end that is of the inner duct and that is close to the air outlet end.

In an optional embodiment, the motor fan blade assembly further includes a third motor fan blade assembly, the third motor fan blade assembly includes a third motor and a third fan blade, the third motor drives the third fan blade to rotate about a third output axis of the third motor, and the third output axis is parallel to the first output axis and the second output axis.

In an optional embodiment, the third motor fan blade assembly is disposed in parallel with the first motor fan blade assembly and the second motor fan blade assembly.

In an optional embodiment, the duct assembly further includes a fastening base, and the three motor fan blade assemblies are fastened in the outer duct by using the fastening base.

In an optional embodiment, the blower further includes a blowpipe, the blowpipe is connected to the air outlet end, and the blowpipe has a first air guide channel, a second air guide channel, and a third air guide channel that are independent of each other; the first motor fan blade assembly communicates with the first air guide channel for allowing air generated by the first motor fan blade assembly to flow along the first air guide channel; the second motor fan blade assembly communicates with the second air guide channel for allowing air generated by the second motor fan blade assembly to flow along the second air guide channel; and the third motor fan blade assembly communicates with the third air guide channel for allowing air generated by the third motor fan blade assembly to flow along the third air guide channel.

In an optional embodiment, the blowpipe is formed by connecting three pipe bodies disposed in parallel, and a cavity of each pipe body is used as one of the air guide channels.

In an optional embodiment, the blower further includes a nozzle, the nozzle has a connection end and an air outlet

3 opposite to the connection end, the connection end of the nozzle is connected to an end that is of the blowpipe and that is away from the outer duct, and the nozzle is configured to converge the air flown out from the first air guide channel, the second air guide channel, and the third air guide channel and then flow out the air through the air outlet.

In an optional embodiment, the housing includes a first housing and a second housing, the first housing and the second housing interlock to form an accommodation cavity, and the duct assembly is disposed in the accommodation cavity.

In an optional embodiment, an air cover is disposed at the air inlet end, the air cover includes a first air cover and a second air cover, the first air cover is disposed on the first housing, and the second air cover is disposed on the second housing.

In an optional embodiment, the blower further includes a blowpipe, one end of the blowpipe is connected to the air outlet end of the housing, and the other end thereof is connected to a nozzle.

In an optional embodiment, the blower further includes an air guide cylinder disposed in the housing, the air guide cylinder is located between the air inlet end and the outer duct, and the air guide cylinder is connected to an end that is of the outer duct and that is close to the air inlet end.

In an optional embodiment, the air guide cylinder is horn-shaped, and a cross-sectional area of an opening at an end of the air guide cylinder close to the air inlet end is greater than a cross-sectional area of an opening at an end of the air guide cylinder close to the air outlet end. The blower in some embodiments of the present disclosure includes at least two motor fan blade assemblies. Each motor fan blade assembly uses a motor with a high rotational speed to match a small fan blade. At least two motors and fan blades of a same blower can run simultaneously. This can not only reduce working noise, but also meet a requirement of a high wind speed and a high air volume at a high rotational speed.

In a use process of the blower in some embodiments of the present disclosure, one or more motors may be selected to run based on a requirement, so as to adjust wind force or an air volume.

Based on a configuration of the blowpipe of the blower in some embodiments of the present disclosure, mutual impact between air generated by several motor fan blade assemblies can be reduced, so as to increase a wind speed and an air volume of the blower.

Based on configurations of the nozzle and the blowpipe in some embodiments of the present disclosure, mutual impact between air generated by several motor fan blade assemblies can be reduced, so as to increase a wind speed and an air volume of the blower.

4

Figure 4:
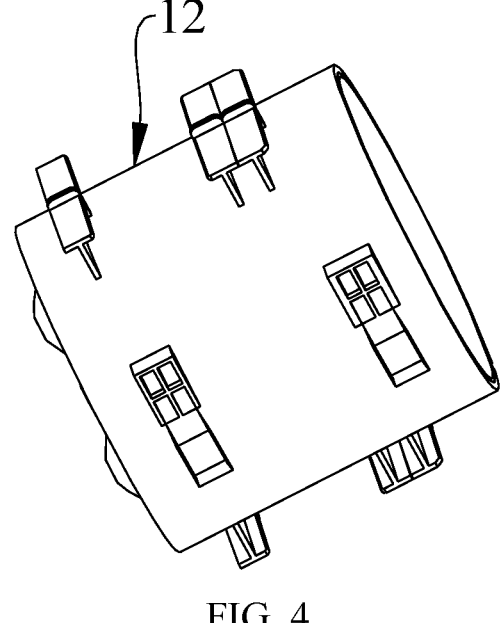
Figure 5:
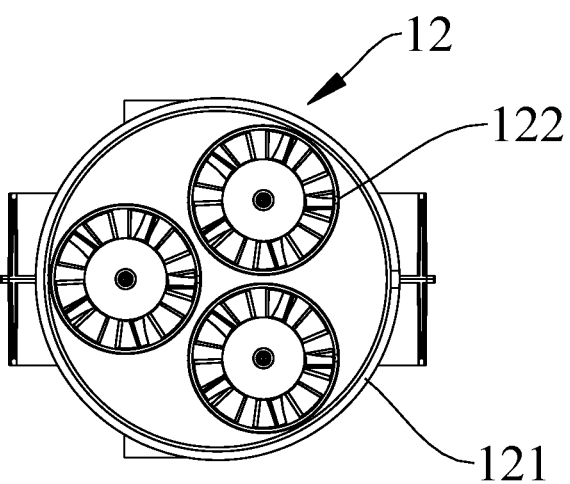
Figure 6:
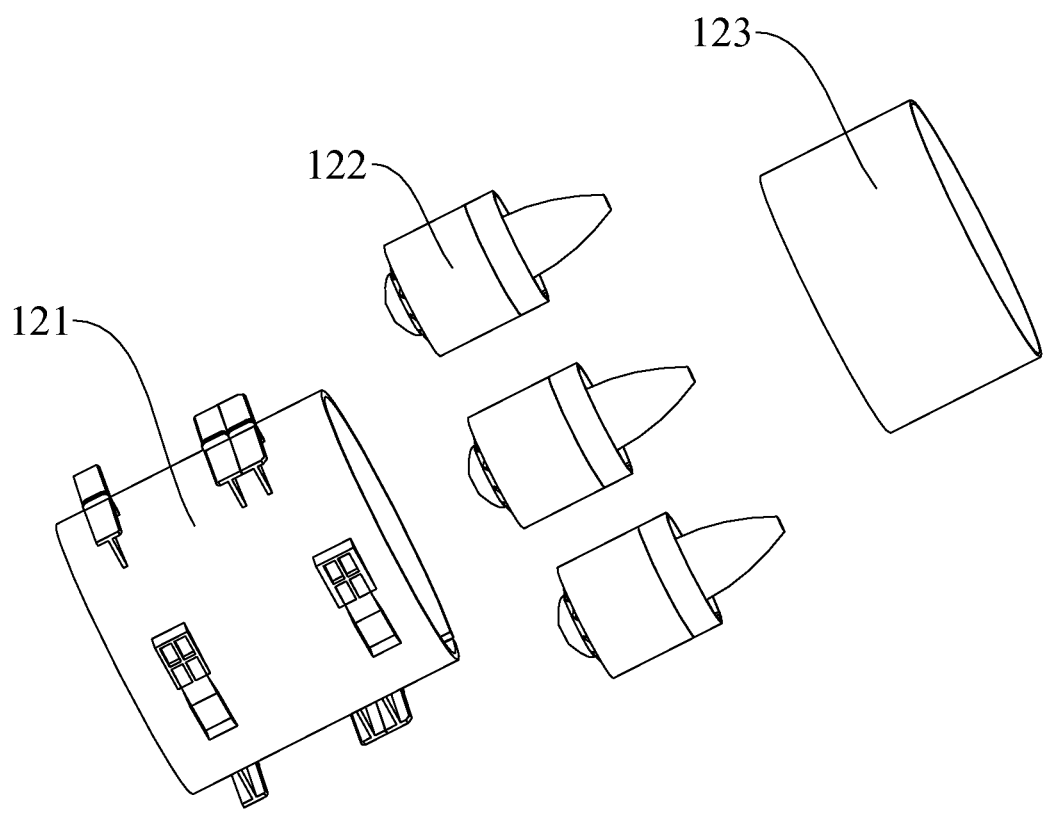
Figure 7:
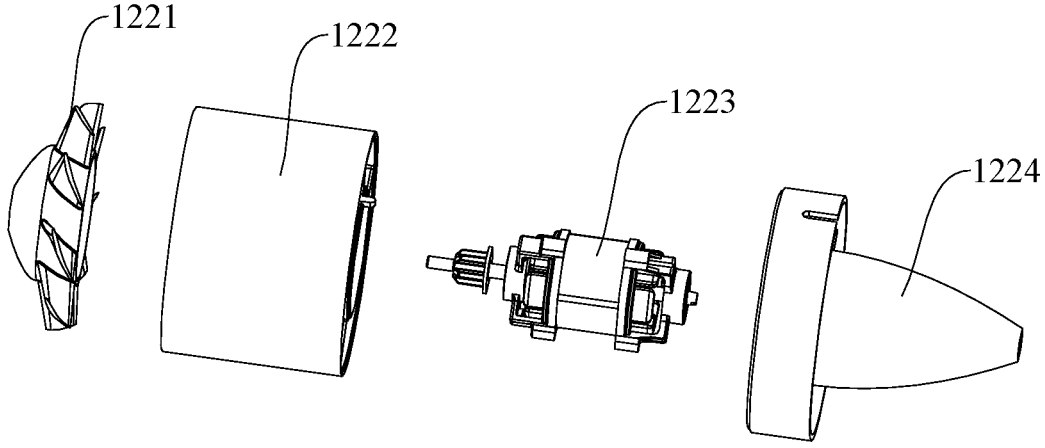
Figure 8:
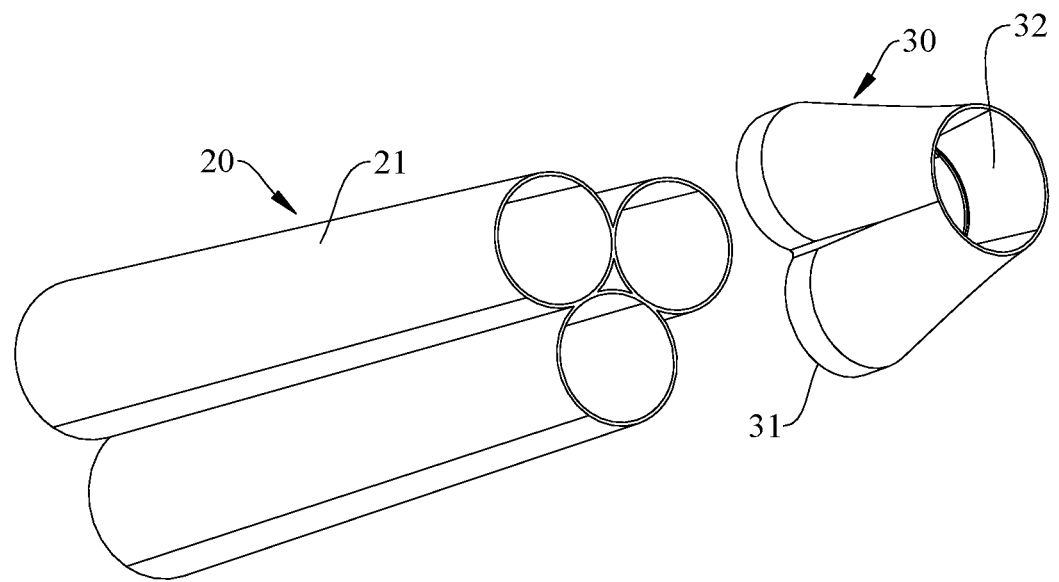
Figure 9:
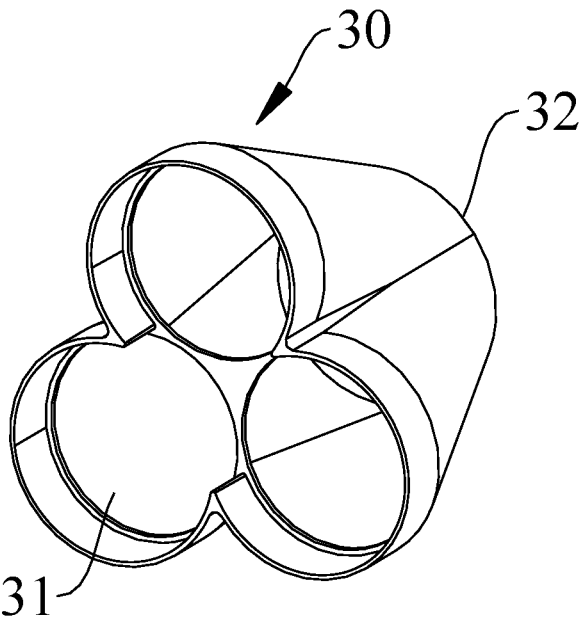
Figure 10:
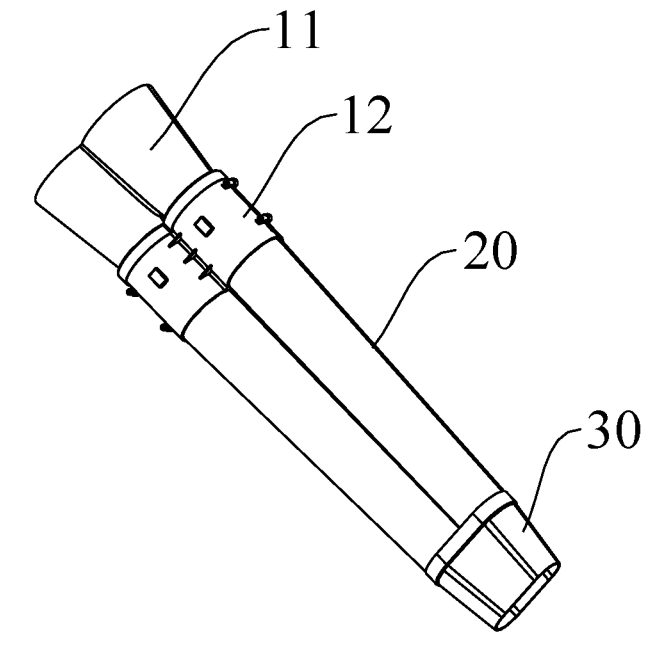
Figure 11:
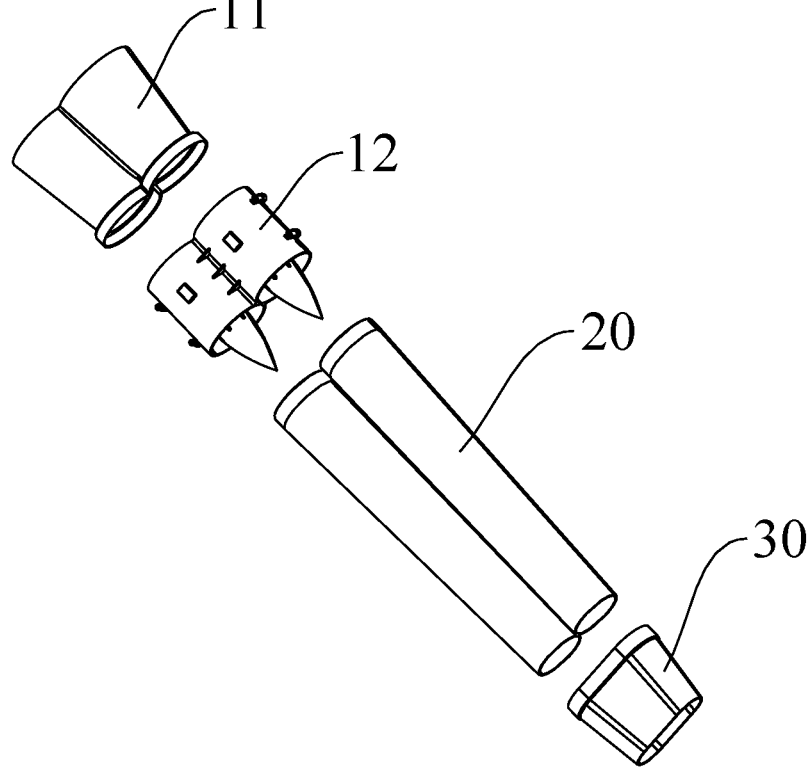
Figure 12:
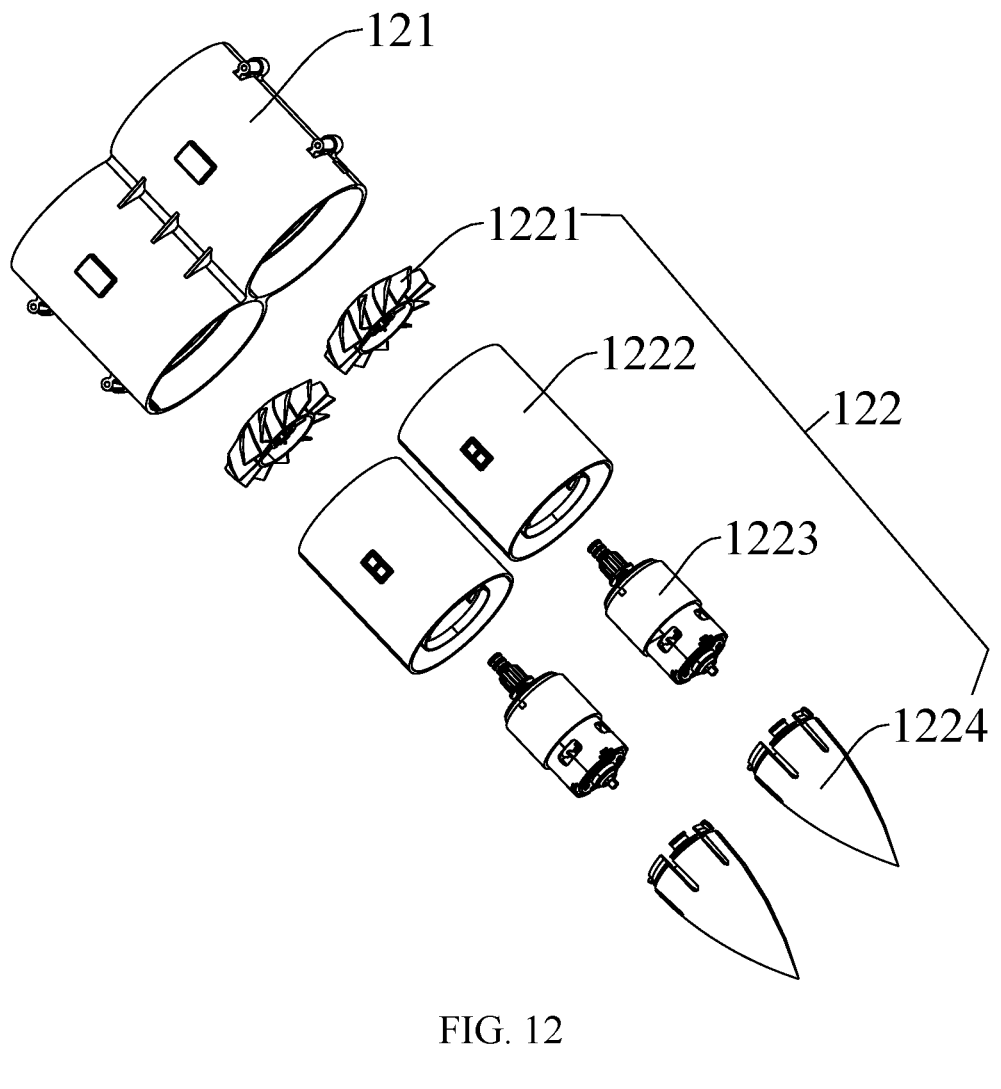
Figure 13:
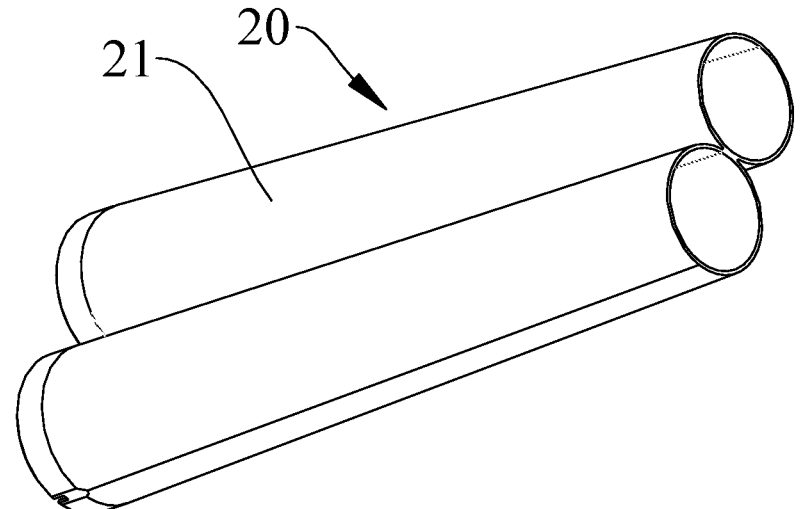
Figure 14:
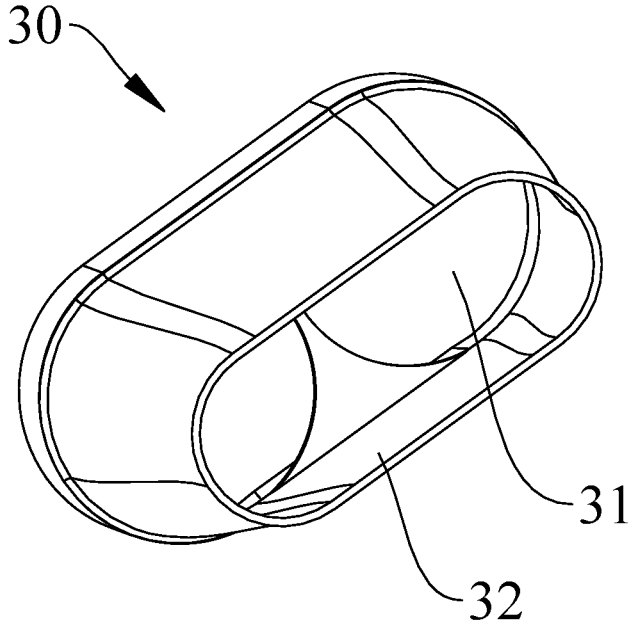
Figure 15:
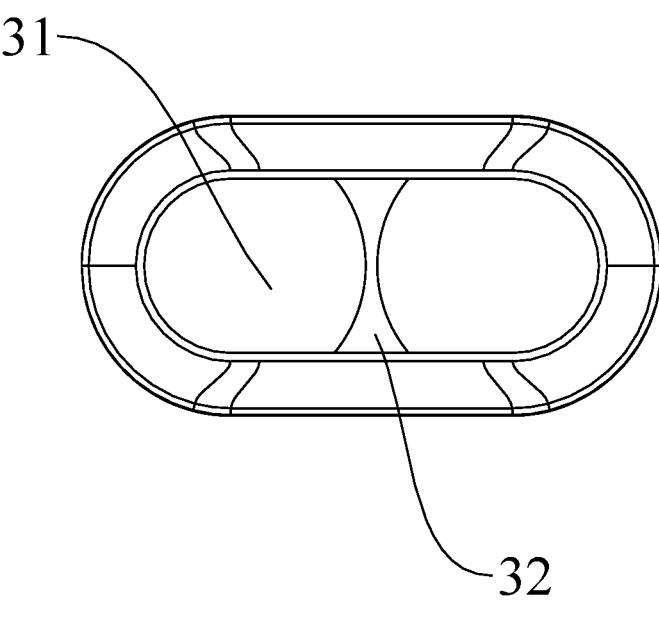
Figure 16:
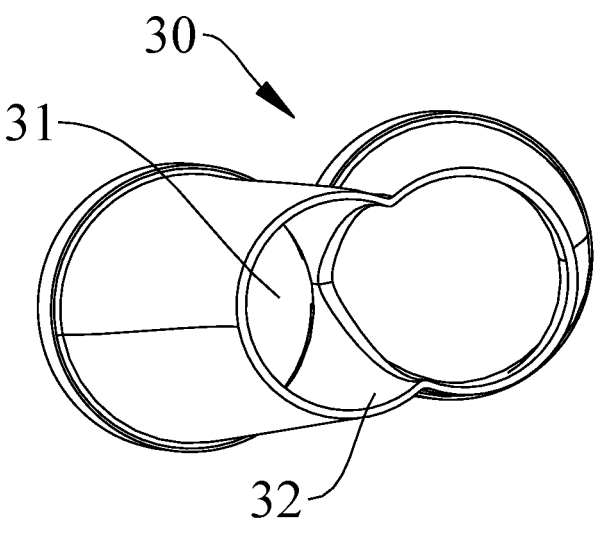
Figure 17:
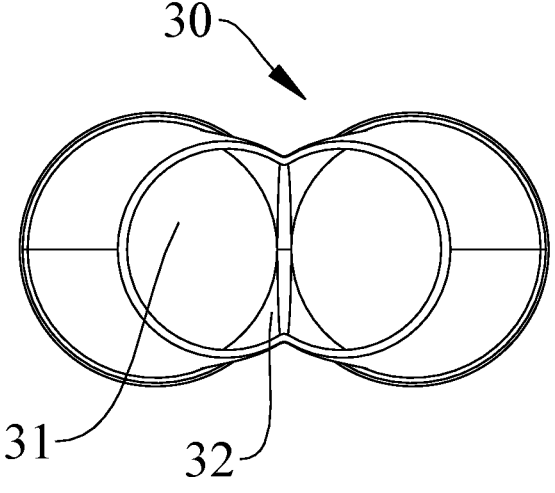
Figure 18:
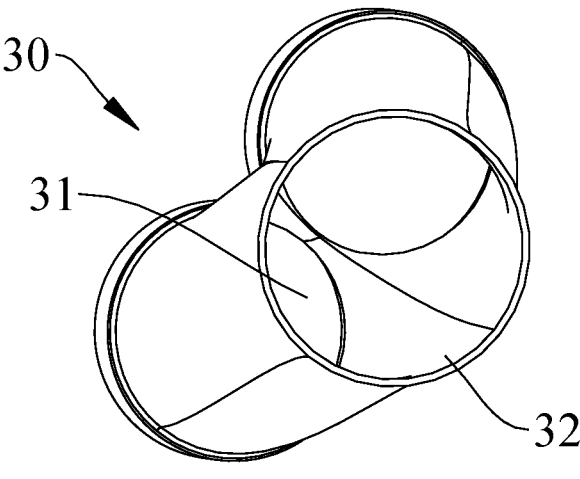
Figure 19:
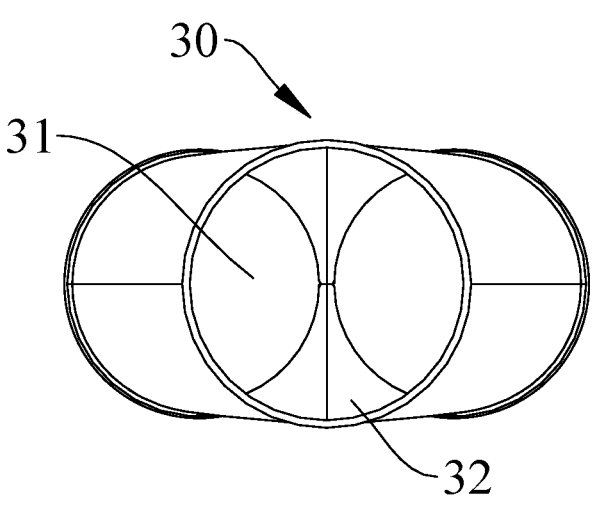
Figure 20:
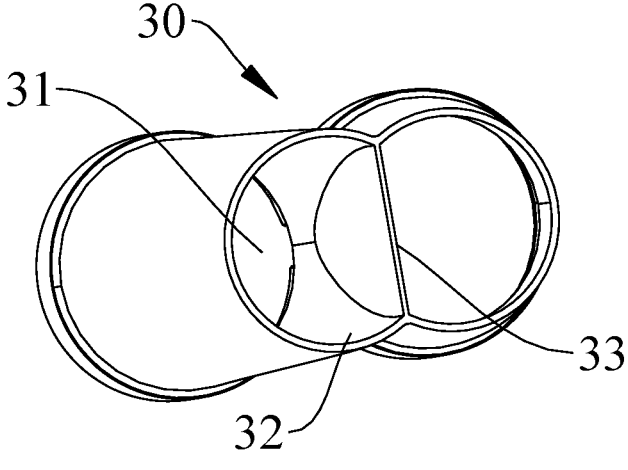
Figure 21:
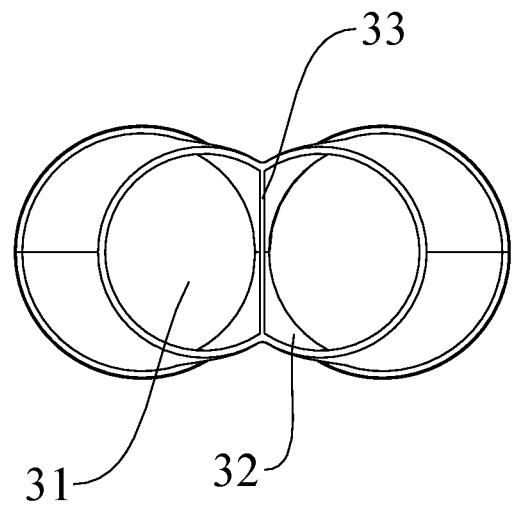

FIG. 4 is a perspective schematic diagram of a duct assembly of a blower having three motor fan blade assemblies according to an exemplary embodiment of the present disclosure;

FIG. 5 is a left view of a duct assembly of a blower having three motor fan blade assemblies according to an exemplary embodiment of the present disclosure;

FIG. 6 is an exploded diagram of a duct assembly of a blower having three motor fan blade assemblies according to an exemplary embodiment of the present disclosure;

FIG. 7 is an exploded diagram of a motor fan blade assembly of a duct assembly of a blower having three motor fan blade assemblies according to an exemplary embodiment of the present disclosure;

FIG. 8 is an exploded diagram of improved structures of a blowpipe and a nozzle of a blower having three motor fan blade assemblies according to an exemplary embodiment of the present disclosure;

FIG. 9 is a perspective schematic diagram of the nozzle shown in FIG. 8;

FIG. 10 is a schematic diagram of a combination of an air guide cylinder, a duct assembly, a blowpipe, and a nozzle of a blower having two motor fan blade assemblies according to an exemplary embodiment of the present disclosure;

FIG. 11 is an exploded diagram of an air guide cylinder, a duct assembly, a blowpipe, and a nozzle of a blower having two motor fan blade assemblies according to an exemplary embodiment of the present disclosure;

FIG. 12 is an exploded diagram of a duct assembly of a blower having two motor fan blade assemblies according to an exemplary embodiment of the present disclosure;

FIG. 13 is a structure schematic diagram of a blowpipe of a blower having two motor fan blade assemblies according to an exemplary embodiment of the present disclosure;

FIG. 14 is a first structure schematic diagram of a nozzle of a blower having two motor fan blade assemblies according to an exemplary embodiment of the present disclosure;

FIG. 15 is a first front view of a nozzle of a blower having two motor fan blade assemblies according to an exemplary embodiment of the present disclosure;

FIG. 16 is a second structure schematic diagram of a nozzle of a blower having two motor fan blade assemblies according to an exemplary embodiment of the present disclosure;

FIG. 17 is a second front view of a nozzle of a blower having two motor fan blade assemblies according to an exemplary embodiment of the present disclosure;

FIG. 18 is a third structure schematic diagram of a nozzle of a blower having two motor fan blade assemblies according to an exemplary embodiment of the present disclosure;

FIG. 19 is a third front view of a nozzle of a blower having two motor fan blade assemblies according to an exemplary embodiment of the present disclosure;

FIG. 20 is a fourth structure schematic diagram of a nozzle of a blower having two motor fan blade assemblies according to an exemplary embodiment of the present disclosure; and FIG. 21 is a fourth front view of a nozzle of a blower having two motor fan blade assemblies according to an exemplary embodiment of the present disclosure.

10: main body; 11: air guide cylinder; 12: duct assembly; 121: outer duct; 122: motor fan blade assembly; 1221: fan blade; 1222: inner duct; 1223: motor; 1224: guiding cone; 123: fastening base; 13: housing; 13*a*: first housing; 13*b*: second housing; 14: base; 15*a*: first air cover; 15*b*: second air cover; 20: blowpipe; 21: pipe body; 30: nozzle; 31: connection end; and 32: air outlet.

DESCRIPTION OF EMBODIMENTS

The following describes implementations of the present disclosure by using specific embodiments. A person skilled in the art may easily learn of other advantages and effects of the present disclosure based on content disclosed in this specification. The present disclosure can be further implemented or applied in some other different specific implementations. Various details in this specification can also be modified or altered based on different viewpoints and applications without departing from the present disclosure.

Refer to FIG. 1 to FIG. 21. It should be noted that, the illustrations provided in some embodiments merely describe the basic concept of the present disclosure by using examples. Although the drawings show only components related to the present disclosure, and are not drawn based on a quantity of components, a shape of a component, and a size of a component during actual implementation, a shape, a quantity, and a scale of the components may be arbitrarily changed during actual implementation, and a component layout form may be more complex.

To resolve a problem that a blower using a large fan blade cannot meet a requirement of providing a high wind speed and a high air volume at a high rotational speed, and the large fan blade has poor stability, a high dynamic balance requirement, and large working noise, an exemplary embodiment of the present disclosure provides a blower, where the blower includes a housing and at least two motor fan blade assemblies disposed in parallel in the housing. Each motor fan blade assembly uses a motor with a high rotational speed to match a small fan blade. At least two motors and at least two fan blades of a same blower can run simultaneously. This can not only reduce working noise, but also meet a requirement of a high wind speed and a high air volume at a high rotational speed.

Referring to FIG. 1 to FIG. 7, an exemplary embodiment of the present disclosure provides a blower having three motor fan blade assemblies 122. The blower includes a main body 10, a blowpipe 20, and a nozzle 30. The blowpipe 20 is mounted on one side of the main body 10, and the nozzle 30 is mounted at an end of the blowpipe 20 that is away from the main body 10.

Referring to FIG. 1 to FIG. 7, the main body 10 includes a housing 13, an outer duct 121 disposed in the housing 13, and three motor fan blade assemblies 122 disposed in parallel in the outer duct 121. The outer duct 121 and the three motor fan blade assemblies 122 jointly constitute a duct assembly 12.

Figure 1:
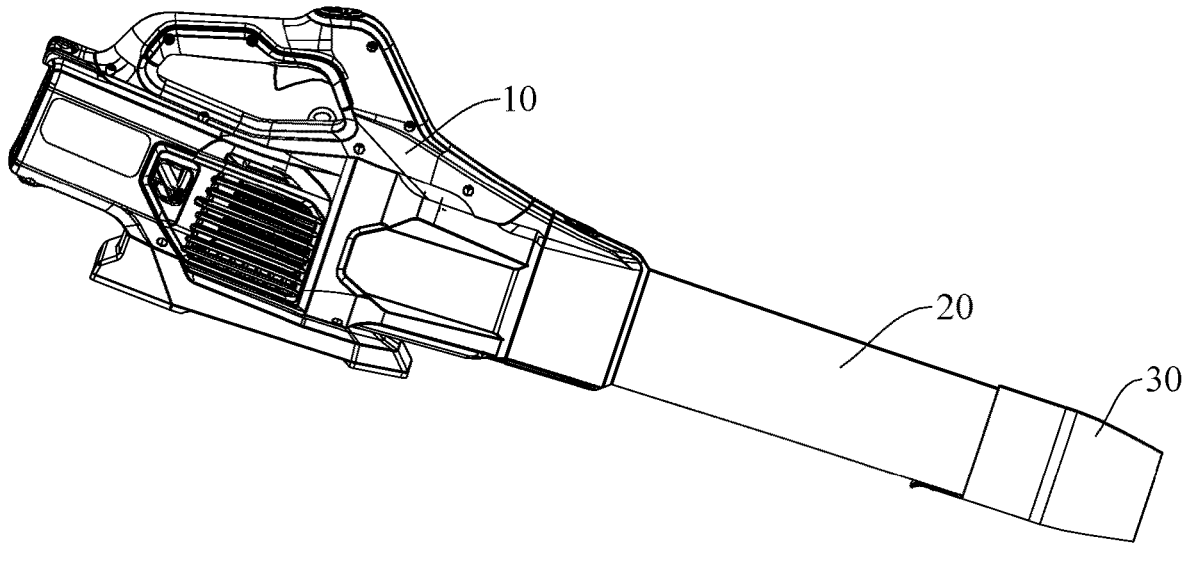
FIG. 1 is a schematic diagram of a three-dimensional structure of a blower having three motor fan blade assemblies according to an exemplary embodiment of the present disclosure.
Figure 2:
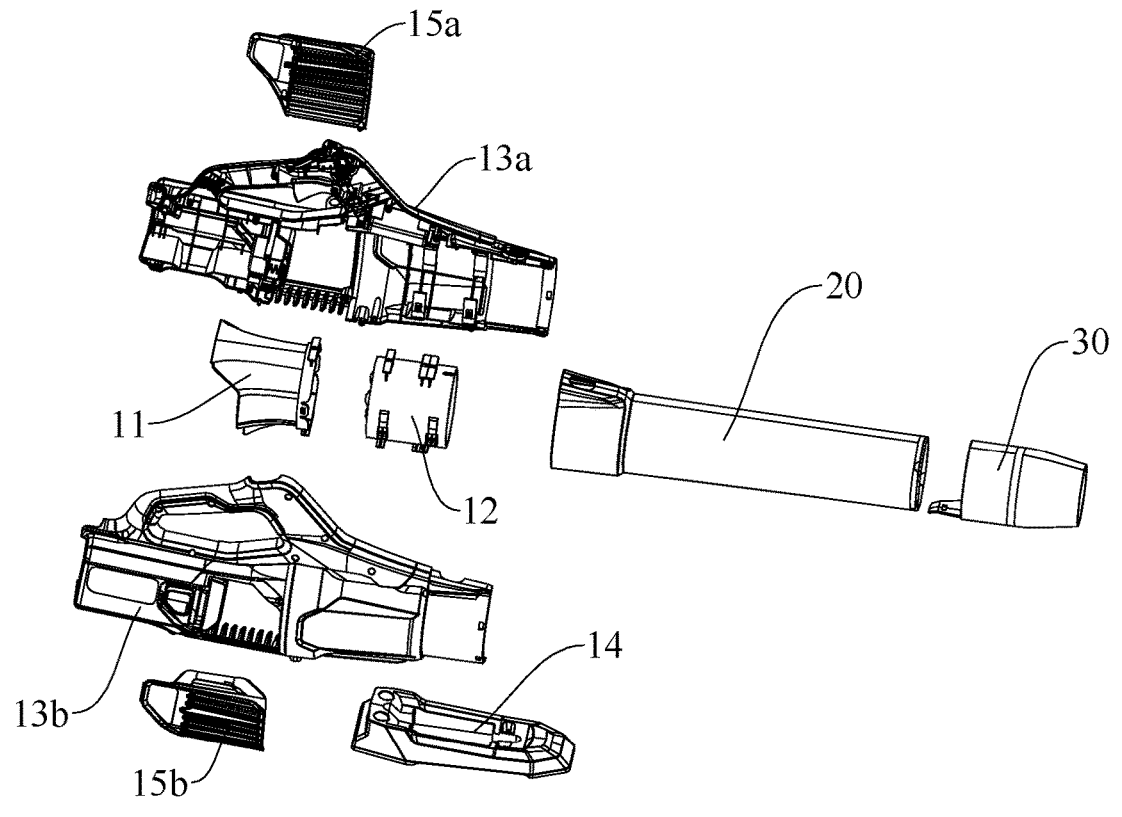
FIG. 2 is an exploded diagram of a blower having three motor fan blade assemblies according to an exemplary embodiment of the present disclosure.
Figure 3:
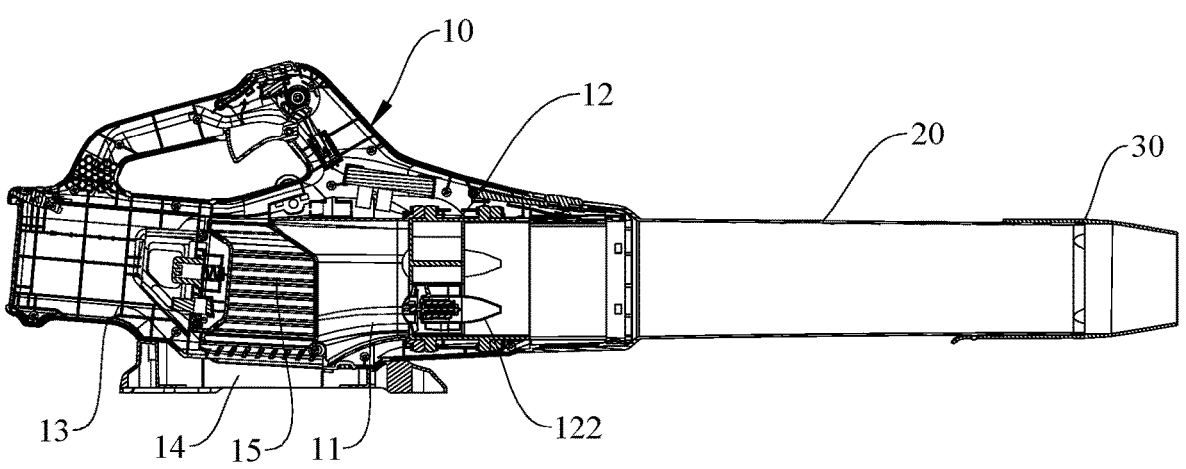
FIG. 3 is a sectional diagram of a blower having three motor fan blade assemblies according to an exemplary embodiment of the present disclosure.

Referring to FIG. 1 to FIG. 3, the housing 13 is provided with an air inlet end and an air outlet end, and an airflow enters the housing 13 from the air inlet end, and flows out of a blowing side after being pressurized. A grille-shaped air cover is disposed at the air inlet end of the housing 13, and the airflow enters the housing 13 from the air cover. In this way, debris can be prevented from entering the housing 13, to prevent the debris from being in contact with a fan blade 1221, so that the fan blade 1221 can run smoothly, thereby ensuring safety during running of the blower, and improving reliability of the blower.

Specifically, the housing 13 includes a first housing 13a and a second housing 13b. The first housing 13a and the second housing 13b are connected to form an accommodation cavity. The accommodation cavity is configured to accommodate the duct assembly 12, and the duct assembly 12 is located between the air inlet end and the air outlet end. To ensure uniform air intake, the air cover includes a first air cover 15a and a second air cover 15b that are respectively disposed on two opposite sides of the housing 13. The first air cover 15a is disposed on the first housing 13a, and the second air cover 15b is disposed on the second housing 13b.

Referring to FIG. 1 to FIG. 3, to facilitate placement, the blower further includes a base 14, the base 14 is disposed at a bottom of the housing 13, and the base 14 and the housing 13 may be fastened to each other through bolted connection or by using a snap-fit.

Referring to FIG. 1 to FIG. 3, an air guide cylinder 11 for guiding and restricting the airflow is further disposed in the accommodation cavity of the housing 13, the air guide cylinder 11 is located between the air inlet end and the outer duct 121, and the air guide cylinder 11 is sleeved on an end of the outer duct 121 that is close to the air inlet end.

Referring to FIG. 2 and FIG. 3, the air guide cylinder 11 is horn-shaped, an opening at an end of the air guide cylinder 11 close to the air inlet end is large, and an opening at an end of the air guide cylinder 11 close to the air outlet end is small, that is, a cross-sectional area of the end of the air guide cylinder 11 close to the air inlet end is greater than a cross-sectional area of the end of the air guide cylinder 11 close to the air outlet end, so that the airflow can enter the outer duct 121.

Referring to FIG. 2 to FIG. 6, the outer duct 121 is cylindrical shaped, an insertion part is formed on an outer side of the outer duct 121, and a slot that matches the insertion part is disposed on an inner side of the housing 13. During mounting, the insertion part is inserted into the slot, so that the outer duct 121 is fastened in the accommodation cavity of the housing 13. This not only facilitates disassembly of the outer duct 121, but also provides a limiting function. Certainly, the outer duct 121 may be fastened in the accommodation cavity of the housing 13 in another manner, for example, by using a bolt.

Referring to FIG. 2 to FIG. 6, three mounting cavities (a quantity of mounting cavities is the same as a quantity of motor fan blade assemblies 122) that are configured to mount the motor fan blade assemblies 122 and that are arranged in parallel are formed in the outer duct 121. Each motor fan blade assembly 122 is mounted in one mounting cavity, that is, the three motor fan blade assemblies 122 are mounted in the outer duct 121. The three motor fan blade assemblies 122 are arranged at equal intervals in an equilateral triangle, and rotation axes of the three motor fan blade assemblies 122 are parallel. In an optional embodiment, the outer duct 121 may be formed by connecting three circular pipes disposed in parallel, and each circular pipe is used as a mounting cavity for mounting the motor fan blade assembly 122.

Referring to FIG. 2 to FIG. 7, each motor fan blade assembly 122 includes an inner duct 1222, a fan blade 1221, and a motor 1223. The inner duct 1222 may be fastened in the mounting cavity of the outer duct 121, for example, by using an interference fit or through bolted connection. The motor 1223 is mounted in the inner duct 1222, the fan blade 1221 is assembled on an output shaft of the motor 1223, the motor 1223 drives the fan blade 1221 to rotate about the output axis of the motor 1223, and the fan blade 1221 is located at an end of the inner duct 1222 that is close to the air inlet end. The blower in the present disclosure uses a structure with a plurality of motors 1223 and a plurality of fan blades 1221. Therefore, the motor 1223 and the fan blade 1221 may use a combination of a motor with a high rotational speed and a small fan blade. Because the small fan blade has good stability, a low dynamic balance requirement, and low working noise, it can be ensured that the blower has low noise during working, and the plurality of motors 1223 and the plurality of fan blade 1221 can run simultaneously, thereby meeting a requirement of a high wind speed and a high air volume at a high rotational speed.

The motor 1223 of each motor fan blade assembly 122 in the blower in the present disclosure may work independently. During actual running, one or more motors 1223 may be selected to run based on a requirement, so as to adjust wind force or an air volume.

Referring to FIG. 2 to FIG. 7, to facilitate gas flow, reduce a flow path of the airflow, and improve air outlet efficiency of the blower, the motor fan blade assembly 122 further includes a guiding cone 1224, the guiding cone 1224 is mounted at an end of the inner duct 1222 close to the air outlet end, and the inner duct 1222 and the guiding cone 1224 are connected to each other, for example, by using a snap-fit, to form a closed structure.

Referring to FIG. 2 to FIG. 6, the duct assembly 12 further includes a fastening base 123, the fastening base 123 is cylindrical shaped, the fastening base 123 is nested at the end of the outer duct 121 close to the air inlet end, and the three motor fan blade assemblies 122 are fastened in the outer duct 121 by using the fastening base 123. Three holes are disposed at a bottom of the fastening base 123, each hole is disposed coaxially with one mounting cavity of the outer duct 121, and each hole communicates with an inner duct 1222 of one motor fan blade assembly 122, so that the airflow flows out of the hole through the inner duct 1222. Certainly, in some embodiments, the duct assembly 12 may not be provided with the fastening base 123.

When the blower works, at least one motor 1223 may be controlled to drive a corresponding fan blade 1221 to work. External air sequentially enters the air guide cylinder 11 through the air inlet end, is accelerated and pressurized by the fan blade 1221, and is flown out from the nozzle 30 through the blowpipe 20.

Referring to FIG. 1 to FIG. 3, the blowpipe 20 is generally of a circular pipe structure, and a cavity of the blowpipe 20 is used as an air guide channel. One end of the blowpipe 20 is connected to the air outlet end of the housing 13 by using a snap-fit, and the other end of the blowpipe 20 is connected to the nozzle 30. After airflows that flow out of the inner ducts 1222 of the three motor fan blade assemblies 122 converge, the airflows are flown out from the nozzle 30 through the blowpipe 20.

In FIG. 1 to FIG. 3, because there is only one air guide channel in the blowpipe 20, air generated by the three motor fan blade assemblies 122 affects each other when passing through the blowpipe 20. This affects the efficiency of the blower. Therefore, in the present disclosure, the blowpipe 20 and the nozzle 30 of the blower using three motor fan blade assemblies 122 are correspondingly improved. FIG. 8 is an exploded diagram of the improved blowpipe 20 and the improved nozzle 30, and FIG. 9 is a schematic diagram of a three-dimensional structure of the nozzle shown in FIG. 8.

Referring to FIG. 8 and FIG. 9, the blowpipe 20 is formed by connecting three pipe bodies 21 disposed in parallel. A cavity of each pipe body 21 is used as an air guide channel, and the air guide channel is disposed in an axial direction of the pipe body 21 and is a through channel. In other words, the blowpipe 20 has three air guide channels disposed in parallel, and the three air guide channels are separated from each other, and do not affect each other. For example, the pipe body 21 may be a circular pipe or a conical pipe.

Similarly, as shown in FIG. 10 to FIG. 12, the outer duct 121 is formed by connecting three circular pipes disposed in parallel, and each circular pipe is used as a mounting cavity for mounting the motor fan blade assembly 122. The air guide cylinder 11 is formed by joining three horn-shaped pipes disposed in parallel, and an end of the air guide cylinder 11 is sleeved on an end of the outer duct 121 away from the blowpipe 20. The blowpipe 20 is assembled at an end of the outer duct 121 away from the air guide cylinder 11, and each air guide channel communicates with an inner duct 1222 of one motor fan blade assembly 122. Therefore, air generated by the motor fan blade assemblies 122 flows through different air guide channels, is flown out from an air outlet of the nozzle 30, and does not affect each other, so that efficiency of the blower can be improved. Certainly, the blowpipe 20 may be cylindrical, three air guide channels are disposed in the blowpipe, and each air guide channel is parallel to the axial direction of the blowpipe 20. Therefore, it is ensured that when the blowpipe 20 is assembled at the end of the outer duct 121 away from the air guide cylinder 11, each air guide channel communicates with an inner duct 1222 of one motor fan blade assembly 122.

Referring to FIG. 8 and FIG. 9, the nozzle 30 is configured to control the airflow at the air outlet 32 of the blower. The nozzle 30 is generally a conical pipe. The nozzle 30 has a connection end and an air outlet 32 opposite to the connection end 31. An outer contour of the nozzle 30 gradually contracts from the connection end to an end with the air outlet. A shape of the connection end of the nozzle 30 matches a shape of an end of the blowpipe 20 away from the outer duct 121. The connection end of the nozzle 30 is sleeved on the end of the blowpipe 20 away from the outer duct 121. The nozzle 30 is configured to converge air flown out from the three air guide channels and then flow out the air through the air outlet 32. Three air inlets 31 are disposed on the connection end 31 of the nozzle 30, each air inlet 31 communicates with one air guide channel of the blowpipe 20, the three air inlets 31 communicate with the air outlet 32 by using an inner cavity of the nozzle 30, and the air outlet 32 is circular or in another suitable shape. The air generated by the motor fan blade assemblies 122 flows to the nozzle 30 through different air guide channels, is converged by the nozzle 30, and then is flown out from the air outlet 32.

Certainly, the air outlet 32 of the nozzle 30 may be divided into three independent sub-outlets, and each sub-outlet communicates with one air inlet 31. Therefore, the air generated by the motor fan blade assemblies 122 flows to the nozzle 30 through different air guide channels, is converged by the nozzle 30, and then is flown out from different sub-outlets.

FIG. 10 to FIG. 12 show a blower having two motor fan blade assemblies 122. For simplification, FIG. 10 and FIG. 11 show only the air guide cylinder 11, the duct assembly 12, the blowpipe 20, and the nozzle 30, but do not show structures such as the housing 13, the air cover, and the base 14.

Referring to FIG. 10 to FIG. 12, the duct assembly 12 also includes an outer duct 121 and two motor fan blade assemblies 122 disposed in the outer duct 121. The outer duct 121 is formed by connecting two circular pipes disposed in parallel, and each circular pipe is used as a mounting cavity for mounting the motor fan blade assembly 122. In an optional embodiment, the duct assembly 12 may be cylindrical, two mounting cavities are disposed in the duct assembly, and each motor fan blade assembly 122 is mounted in one mounting cavity.

The motor fan blade assembly 122 is also formed by an inner duct 1222, a motor 1223, a fan blade 1221, and a guiding cone 1224. The inner duct 1222 may be fastened in the mounting cavity of the outer duct 121, for example, by using an interference fit or through bolted connection. The motor 1223 is mounted in the inner duct 1222, the fan blade 1221 is assembled on an output shaft of the motor 1223, and the fan blade 1221 is located at an end of the inner duct 1222 close to the air inlet end. The guiding cone 1224 is mounted at an end of the inner duct 1222 close to the air outlet end. The inner duct 1222 and the guiding cone 1224 are connected to each other, for example, by using a snap-fit. For details, refer to the foregoing descriptions.

Referring to FIG. 10 to FIG. 12, the air guide cylinder 11 is formed by joining two horn-shaped pipes disposed in parallel, and an end of the air guide cylinder 11 is sleeved on an end of the outer duct 121 away from the blowpipe 20.

Referring to FIG. 10 to FIG. 13, one end of the blowpipe 20 is assembled at an end of the outer duct 121 away from the air guide cylinder 11, and the other end thereof is connected to the nozzle 30. The blowpipe 20 is formed by connecting two pipe bodies 21 disposed in parallel. A cavity of each pipe body 21 is used as an air guide channel, and the air guide channel is disposed in an axial direction of the pipe body 21. In other words, the blowpipe 20 has two air guide channels disposed in parallel, and the two air guide channels are separated from each other, and do not affect each other. Each air guide channel communicates with an inner duct 1222 of one motor fan blade assembly 122. In this way, air generated by the two motor fan blade assemblies 122 does not affect each other, so that efficiency of the blower can be improved. For example, the pipe body 21 may be a circular pipe or a conical pipe.

Referring to FIG. 10 to FIG. 15, the nozzle 30 is configured to control the airflow at the air outlet 32 of the blower, and the nozzle 30 has a connection end and an air outlet 32 opposite to the connection end. A shape of the connection end of the nozzle 30 matches a shape of an end of the blowpipe 20 away from the outer duct 121. The connection end of the nozzle 30 is sleeved on the end of the blowpipe 20 away from the outer duct 121. The nozzle 30 is configured to converge air flown out from the two air guide channels and then flow out the air through the air outlet 32.

Referring to FIG. 10 to FIG. 15, two air inlets 31 are disposed on the connection end of the nozzle 30, each air inlet 31 communicates with one air guide channel of the blowpipe 20, the two air inlets 31 communicate with the air outlet 32 by using an inner cavity of the nozzle 30, and the air outlet 32 is an oblong hole (also referred to as a waist-shaped hole). The air generated by the motor fan blade assemblies 122 flows to the nozzle 30 through different air guide channels, is converged by the nozzle 30, and then is flown out from the air outlet 32.

Certainly, the air outlet 32 of the nozzle 30 may be in another shape. For example, the air outlet 32 of the nozzle 30 may be in a shape that is shown in FIG. 16 and FIG. 17 and that is formed by joining end points of two equal-radius major arcs, or a circle shown in FIG. 18 and FIG. 19. The major arc is defined as an arc greater than a semicircle or an arc whose central angle is greater than 180°.

In an optional embodiment, the air outlet 32 of the nozzle 30 may alternatively be in a shape that is shown in FIG. 20 and FIG. 21 and that is formed by joining end points of two equal-radius major arcs, and the air outlet 32 is divided into two independent sub-outlets by using a partition plate 33. The partition plate 33 is located at a joining part between the two major arcs, and the partition plate 33 extends from the connection end of the nozzle 30 to the air outlet 32. Each sub-outlet communicates with one air guide channel. Therefore, the air generated by the motor fan blade assemblies 122 flows to the nozzle 30 through different air guide channels, is converged by the nozzle 30, and then is flown out from different sub-outlets. Certainly, the air outlet 32 of the nozzle 30 shown in FIG. 14 and FIG. 15, FIG. 16 and FIG. 17, and FIG. 18 and FIG. 19 may also be divided into two independent sub-outlets by using a partition plate.

It may be understood that, in another embodiment, the blower may alternatively include four or more motor fan blade assemblies 122. Correspondingly, shapes of the blowpipe 20 and the nozzle 30 also need to be adaptively changed.

In conclusion, the blower in the present disclosure includes at least two motor fan blade assemblies. Each motor fan blade assembly uses a motor with a high rotational speed to match a small fan blade. At least two motors and fan blades of a same blower can run simultaneously. This can not only reduce working noise, but also meet a requirement of a high wind speed and a high air volume at a high rotational speed. In a use process of the blower in the present disclosure, one or more motors may be selected to run based on a requirement, so as to adjust wind force or an air volume.

In the descriptions in this specification, many specific details such as examples of parts and/or methods are provided to provide a complete understanding of the embodiments of the present disclosure. However, a person skilled in the art will recognize that the embodiments of the present disclosure can be practiced without one or more specific details or by using another device, system, assembly, method, part, material, part, or the like. In another case, a well-known structure, material, or operation is not specifically shown or described in detail, to avoid blurring aspects of the embodiments of the present disclosure.

It should also be understood that one or more of the elements shown in the accompanying drawings may also be implemented in a more separate or integrated manner, or may be removed even because the elements are not operable in some cases or may be provided because the elements are useful based on a particular application.

In addition, unless otherwise explicitly specified, any labeled arrow in the accompanying drawings should be considered only as an example, and imposes no limitation. In addition, unless otherwise specified, the term "or" used in this specification generally means "and/or". When it is foreseeable that the term is unclear due to the capability to provide separation or combination, the combination of components or steps is also considered to be specified.

The foregoing descriptions (including content in the abstract of the specification) of the embodiments shown in the present disclosure are not intended to be exhaustively enumerated or limit the present disclosure to the precise form disclosed in this specification. Although specific embodiments and examples of the present disclosure are described only for the purpose of illustration in this specification, a person skilled in the art will appreciate and understand that various equivalent modifications may fall within the scope of the present utility model. As noted, the modifications may be made to the present disclosure based on the foregoing descriptions in the embodiments of the present disclosure, and the modifications fall within the scope of the present disclosure.

Systems and methods have been described in this specification in general to facilitate an understanding of the details of the present disclosure. In addition, various specific details have been provided to provide an overall understanding of the embodiments of the present disclosure. However, a person skilled in the art will recognize that the embodiments of the present disclosure can be practiced without one or more specific details, or can be practiced by using another apparatus, system, accessory, method, component, material, part, or the like. In other cases, well-known structures, materials, and/or operations are not specially shown or described in detail, to avoid confusion with various aspects of the embodiments of the present disclosure.

Therefore, although the present disclosure has been described with reference to specific embodiments of the present disclosure, modification freedom, various changes, and substitutions also fall within the foregoing disclosure. In addition, it should be understood that, in some cases, some features of the present disclosure are used without departing from the scope of the proposed utility model and without corresponding use of other features. Therefore, many modifications may be made, so that a particular environment or material is adapted to the substantial scope of the present disclosure. The present disclosure is not intended to be limited to the specific terms used in the claims below and/or specific embodiments disclosed as envisioning to perform the present disclosure in a best manner. However, the present disclosure will include any and all embodiments and equivalents falling within the scope of the appended claims. Therefore, the scope of the present disclosure is determined only by the appended claims.

What is claimed is:

1. A blower, comprising:

a housing, having an air inlet end and an air outlet end; and a duct assembly disposed in the housing, and the duct assembly is located between the air inlet end and the air outlet end, wherein the duct assembly comprises an outer duct and a motor fan blade system, and the motor fan blade system is disposed in the outer duct;

the motor fan blade system comprises a first motor fan blade assembly and a second motor fan blade assembly;

the first motor fan blade assembly comprises a first motor and a first fan blade, and the first motor drives the first fan blade to rotate about a first output axis of the first motor;

the second motor fan blade assembly comprises a second motor and a second fan blade, and the second motor drives the second fan blade to rotate about a second output axis of the second motor; and the first output axis is parallel to the second output axis;

wherein the blower further comprises a blowpipe, the blowpipe is connected to the air outlet end, and the blowpipe has a first air guide channel and a second air guide channel that are independent of each other; the first motor fan blade assembly communicates with the first air guide channel for allowing air generated by the first motor fan blade assembly to flow along the first air guide channel; and the second motor fan blade assembly communicates with the second air guide channel for allowing air generated by the second motor fan blade assembly to flow along the second air guide channel;

wherein the blower further comprises a nozzle, the nozzle has a connection end and an air outlet opposite to the connection end, the connection end of the nozzle is connected to an end of the blowpipe away from the outer duct, and the nozzle is configured to converge the air flown out from the first air guide channel and the second air guide channel and then flow out the air through the air outlet;

wherein the air outlet is divided into two independent sub-outlets, and each sub-outlet communicates with one of the air guide channels.

2. The blower according to claim 1, wherein the first motor fan blade assembly is disposed in the outer duct side-by-side with the second motor fan blade assembly.

3. The blower according to claim 1, wherein the first and second air guide channels are disposed in parallel.

4. The blower according to claim 1, wherein the air outlet comprises a shape formed by joining endpoints of two equal-radius major arcs.

5. The blower according to claim 1, wherein each of the first and second motor fan blade assemblies further comprises an inner duct, and the inner duct is disposed in the outer duct.

6. The blower according to claim 5, wherein each of the first and second motor fan blade assemblies further comprises a guiding cone, and the guiding cone is mounted at an end of the respective inner duct closer to the air outlet end.

7. The blower according to claim 1, wherein the motor fan blade system further comprises a third motor fan blade assembly, the third motor fan blade assembly comprises a third motor and a third fan blade, the third motor drives the third fan blade to rotate about a third output axis of the third motor, and the third output axis is parallel to the first output axis and the second output axis.

8. The blower according to claim 7, wherein the third motor fan blade assembly is disposed in parallel with the first motor fan blade assembly and the second motor fan blade assembly.

9. The blower according to claim 7, wherein the duct assembly further comprises a fastening base, and the first, second, and third motor fan blade assemblies are fastened in the outer duct by the fastening base.

10. The blower according to claim 7, wherein the blowpipe has the first air guide channel, the second air guide channel, and a third air guide channel that are independent of each other; and the third motor fan blade assembly communicates with the third air guide channel for allowing airflow generated by the third motor fan blade assembly to flow along the third air guide channel.

11. The blower according to claim 10, wherein the blowpipe is formed by connecting three pipe bodies disposed in parallel, and a cavity of each pipe body is used as one of the air guide channels.

12. The blower according to claim 10, wherein the nozzle is configured to converge the air flown out from the first air guide channel, the second air guide channel, and the third air guide channel and then flow out the air through the air outlet.

13. The blower according to claim 1, wherein the housing comprises a first housing and a second housing, the first housing and the second housing interlock to form an accommodation cavity, and the duct assembly is disposed in the accommodation cavity.

14. The blower according to claim 13, wherein an air cover is disposed at the air inlet end, the air cover comprises a first air cover and a second air cover, the first air cover is disposed on the first housing, and the second air cover is disposed on the second housing.

15. The blower according to claim 1, wherein the blowpipe has a first end connected to the air outlet end of the housing, and a second end connected to the nozzle.

16. The blower according to claim 1, wherein the blower further comprises an air guide cylinder disposed in the housing, the air guide cylinder is located between the air inlet end and the outer duct, and the air guide cylinder is connected to an end of the outer duct closer to the air inlet end.

17. The blower according to claim 16, wherein the air guide cylinder is horn-shaped, and a cross-sectional area of an opening at an end of the air guide cylinder closer to the air inlet end is greater than a cross-sectional area of an opening at an end of the air guide cylinder closer to the air outlet end.

* * * * *